United States Patent Office 3,849,345
Patented Nov. 19, 1974

3,849,345
CONDUCTIVE ARTICLES MADE FROM BUTADIENE/STYRENE BLOCK COPOLYMERS AND CARBON BLACK
Kenneth E. Snavely, Bartlesville, Okla., assignor to Phillips Petroleum Company
No Drawing. Filed June 27, 1973, Ser. No. 375,798
Int. Cl. C08c 11/18; H01b 1/06
U.S. Cl. 252—511                              4 Claims

ABSTRACT OF THE DISCLOSURE

Novel articles of manufacture are provided which are characterized by being formed of semiconductive rubbery compositions comprised of block copolymers of a conjugated diene and a monovinyl aromatic hydrocarbon and a normally nonconductive carbon black.

This invention relates to electrically semiconductive articles of manufacture.

The accumulation of static electrical charges on rubber articles often causes serious hazardous conditions to arise, in that the electrical potential may become so great that a discharge of the electrical potential occurs in the form of a spark which may ignite inflammable and/or explosive materials in the immediate vicinity or cause discomfort to a person coming in contact therewith. To minimize the hazard of sparking caused by the instantaneous discharge of static electrical charges, rubbery bodies in which static electrical charges may develop should desirably be fabricated of a composition having a low electrical resistivity allowing static electrical charges formed therein to be harmlessly conducted to an electrical ground before a sufficient accumulation of static electrical charges has occurred to cause a spark to form between two or more bodies.

Resistivity is a term of art denoting the unit resistance of a material. It is the reciprocal of conductivity. Thus, a material which has a high conductivity, has a low resistivity. The terms "insulating" and "conductive" are relative terms for which arbitrary standards have been set as follows:

Resistivity, ohm.-cm.
Insulating _____ $10^8$ and greater.
Semiconductive _____ $10^3$–$10^8$.
Conductive _____ $0$–$10^3$.

Adapted from Encyclopedia of Polymer Science and Technology, vol. 5, page 531 (Interscience Publishers, John Wiley & Sons, Inc., New York, 1966).

Since rubbery compositions ordinarily are inherently poor electrical conductors, special compounding techniques have been required in order to obtain electrically conductive rubber articles. Various electrically conductive rubbery compositions such as those containing conductive blacks have been proposed but have not been entirely satisfactory, since large amounts of black are required to obtain a sufficient low electrical resistivity.

Electrically conductive carbon blacks are, further, relatively expensive in comparison to the normally nonconductive blacks. Loadings of 50 to 150 parts by weight of an electrically conductive black have been required for every 100 parts by weight of elastomeric material in order to render the composition semiconductive. Such high loadings, together with the relatively high cost of the conductive blacks, have tended to restrict any wide application of such compositions. Such high loadings can also destroy the physical and chemical properties of the compounded materials.

It is, therefore, an object of this invention to provide semiconductive articles of manufacture.

It is another object of this invention to provide semiconductive articles incorporating a normally nonconductive carbon black.

It is a further object to provide a semiconductive article incorporating a normally nonconductive carbon black in relatively low loading.

Other aspects, objects, and the several advantages of this invention will be apparent to one skilled in the art from the following disclosure and the appended claims.

According to this invention, semiconductive articles are manufactured from compositions comprising rubbery copolymers and normally nonconductive carbon blacks. The term "rubbery copolymer" includes elastomeric, vulcanizable polymeric materials, which, after vulcanization, i.e., crosslinking, possess the properties normally associated with vulcanized rubber.

The rubbery copolymers that can be utilized in the practice of this invention are block copolymers having the general formula $$A-B$$

wherein A is an essentially homopolymer block formed from a monovinyl aromatic hydrocarbon having 8 to 15 carbon atoms; and B is either a homopolymer block formed from a conjugated diene having 4 to 8 carbon atoms or a copolymer block formed from a conjugated diene and a monovinyl aromatic hydrocarbon of the type both as described above. An essential for the success of the present invention is that there be utilized a block copolymer which contains a homopolymer block of monovinyl aromatic hydrocarbon polymer in an amount ranging from 10 to 40 weight percent of the total polymer compositions. Illustrative of the conjugated dienes containing 4 to 8 carbon atoms are 1,3-butadiene; 2,3-dimethyl-1,3-butadiene; 2,4-hexadiene and the like. Suitable monovinyl aromatic hydrocarbons having 8 to 15 carbon atoms include styrene, various alkyl styrenes, vinyl toluene, vinyl naphthalene and the like.

The block copolymers useful in the practice of this invention can be prepared by any method known in the art. For example, a mixture of butadiene and styrene monomers can be polymerized using butyllithium as a catalyst in a hydrocarbon diluent. Optionally, a small amount of a polar compound such as tetrahydrofuran can be employed as a randomizing agent. Such block copolymers can also be prepared by sequential addition of a conjugated diolefin followed by a vinyl aromatic monomer in the presence of a lithium based catalyst.

The carbon blacks which are employed in the practice of this invention are those designated as being normally nonconductive carbon blacks. Normally nonconductive carbon blacks are those carbon blacks which do not impart conductivity or semiconductivity to rubber or rubbery polymer blends upon being incorporated into such blends in amounts less than about 60 parts per 100 parts of rubber. In general, any carbon black not designated as being conductive by the various manufacturers is taken to be nonconductive.

The normally nonconductive carbon blacks useful in the practice of this invention include furnace process oil blacks such as SAF, HAF and GPF; furnace process gas blacks such as HMF and SRF; and the like.

In forming the compositions from which the semiconductive articles of this invention are prepared, a minimum of about 20 parts of a normally nonconductive carbon black per hundred parts (hereinafter designated as phr.) of block copolymer is required. The maximum carbon black level is determined by the desired end use of the composition. A now preferred level is from about 20 to about 50 phr., since this assures adequate conductivity, good physical and chemical characteristics and minimum cost.

The semiconductive articles of this invention can be prepared by admixing the carbon black with the rubbery copolymer with adequate mixing in any way so long as there is produced a homogeneous blend of the components and adequate dispersion of the carbon black. In one such method the articles can be prepared by milling the ingredients on a rubber mill. Likewise the articles of this invention can be prepared by any of the known compounding methods such as have been used for compounding natural rubber. If desired, vulcanization accelerators, fillers and the like, such as have been employed in natural rubber, can be present in the semiconductive articles of this invention. After compounding the raw materials, the semiconductive articles are formed, then vulcanized, by conventional methods.

My electrically conductive rubbery articles are particularly useful under conditions where the formation of static electrical charges are likely to occur. Examples of such articles are gasoline-hose nozzles, anesthesia masks, rubber hose, floor coverings, industrial belts, shoe soles, cable jacketing, semiconductive membranes, semiconductive fabrics and the like.

The following examples further illustrate the present invention.

EXAMPLE I

The copolymers used in the following examples are prepared according to the following recipes:

|  | Copolymers | | | |
|---|---|---|---|---|
|  | A | B | C | D |
| 1,3-butadiene [1] | 52 | 52 | 75 | 75 |
| Styrene [1] | 48 | 48 | 25 | 25 |
| Cyclohexane [1] | 800 | 800 | 800 | 800 |
| n-BuLi, mhm.[2] | 0.11 | 0.09 | 0.11 | 0.09 |
| THF, p.p.m.[3] | 2,000 | 75 | 75 | 2,000 |
| Temperature, °C | 110 | 110 | 110 | 110 |
| Time, minutes | 20 | 30 | 30 | 20 |

[1] Parts by weight.
[2] Millimoles per 100 grams of monomer.
[3] Parts per million parts of solvent by weight.

The polymerization runs are conducted in stirred polymerization reactors which are first charged with the appropriate amount of reaction solvent. The reactor vessels are purged with nitrogen, then charged with monomers in the ratio as indicated above, butyl lithium initiator and tetrahydrofuran. The temperature of the reaction mixture is allowed to rise to about 110° C. and is thereafter maintained at that level for the required reaction time. The reaction mixture is then withdrawn from the reactor vessel and passed to a flash evaporator to remove excess solvent. At this time the reaction is shortstopped: Copolymers A, B, and C are shortstopped by the addition of a small amount of a fatty acid containing, as an antioxidant, 2,6-di-t-butyl-4-methylphenyl. Copolymer D is shortstopped with tin tetrachloride. The thus stabilized rubber solution is steam stripped. The rubber crumb is then dried. The copolymers prepared above have the properties shown in Table I.

TABLE I
[Polymer properties]

|  | Copolymers | | | |
|---|---|---|---|---|
|  | A | B | C | D |
| Butadiene, parts by weight | 52 | 52 | 75 | 75 |
| Styrene, parts by weight | 48 | 48 | 25 | 25 |
| Block polystyrene, weight percent | 10 | 34 | 17 | 0 |
| Weight average molecular weight, ×10⁻³ | 110 | 101 | 83 | 348 |
| Mooney viscosity, ML-4 at 212° F | 48 | 49 | 52 | 59 |

EXAMPLE II

The resistivity of each block copolymer prepared by Example I was determined according to ASTM Method D-257-54T. The block copolymers were prepared for testing according to the following recipe:

COMPOUNDING RECIPE

|  | Parts by weight |
|---|---|
| Polymer | 100.0 |
| Zinc oxide | 5.0 |
| Stearic acid | 2.0 |
| Sulfur | 2.0 |
| Accelerator [1] | 2.0 |
| Nonconductive carbon black [2] | Various |

[1] Di-2-benzothiazyl disulfide.
[2] Philblack N330, a normally nonconductive, HAF, carbon black sold commercially by Phillips Petroleum Company.

The above-listed ingredients were blended together on a rubbery mill until a complete, uniform dispersion was obtained, then vulcanized in a mold at 293° F. for 50 minutes. The resistivity of each copolymer, when compounded with no carbon black and when compounded with 40 phr. carbon black, is given in Table II.

TABLE II

| Copolymer | Block poly-styrene | Resistivity, ohm-cm. | |
|---|---|---|---|
|  |  | 0 phr. CB | 40 phr. CB |
| A | 10 | $5.3 \times 10^{13}$ | $4.9 \times 10^{5}$ |
| B | 34 | $4.9 \times 10^{14}$ | $5.6 \times 10^{5}$ |
| C | 17 | $4.8 \times 10^{14}$ | $3.8 \times 10^{5}$ |
| D | 0 | $4.5 \times 10^{14}$ | $1.7 \times 10^{14}$ |

The above data illustrate that butadiene-styrene copolymers containing block segments of polystyrene are rendered semiconductive by the addition of a normally nonconductive carbon black. A butadiene-styrene copolymer containing no block polystyrene segment exhibits little change in resistivity.

EXAMPLE III

Two series of compositions, one using block copolymer C and one using random copolymer D, were prepared as described in Example II, using amounts of carbon black ranging from 0 to 60 phr. The following results were obtained:

TABLE III

| Carbon black, phr. | Resistivity, ohm-cm. | |
|---|---|---|
|  | Copolymer C | Copolymer D |
| 0 | $4.8 \times 10^{14}$ | $4.5 \times 10^{14}$ |
| 10 | $7.3 \times 10^{13}$ | $9.7 \times 10^{13}$ |
| 20 | $2.2 \times 10^{7}$ | $7.5 \times 10^{13}$ |
| 40 | $3.2 \times 10^{5}$ | $9.5 \times 10^{12}$ |
| 60 | $2.4 \times 10^{3}$ | $2.5 \times 10^{4}$ |

The above data demonstrates that a minimum level of about 20 phr. carbon black is required to render semiconductive a butadiene-styrene copolymer containing block polystyrene.

EXAMPLE IV

A semiconductive conveyor belt is prepared by blending together the following:

|  | Parts by weight |
|---|---|
| Butadiene-styrene block copolymer | 100 |
| Nonconductive carbon black | 40 |
| Phenyl-β-naphthylamine | 2 |
| $ZnO$ | 4 |
| Stearic acid | 2 |
| N-cyclohexyl-2-benzothiazole sulfenamide | 0–8 |
| Tetramethyl thiurammonosulfide | 0–2 |
| Sulfur | 2 |

After blending, the sheet is calendered to a thickness of about ⅜-inch, then laminated to a canvas fabric backing. The rubber is then vulcanized for 20 minutes at 350° F. The conveyor belt material is resistant to static buildup.

EXAMPLE V

A semiconductive membrane is prepared by blending together the following:

| | Parts by weight |
|---|---|
| Butadiene-styrene block copolymer | 100 |
| Nonconductive carbon black | 30 |
| Phenyl-$\beta$-naphthylamine | 4.5 |
| Stearic acid | 1 |
| N-cyclohexyl-2-benzothiazole sulfenamide | 2 |
| 4,4'-dithiodimorpholine | 0.65 |
| Tetraethyl thiuram disulfide | 1.2 |
| Tetramethyl thiuram disulfide | 1.3 |

After blending, the sheet is calendered to a thickness of about 100 mils. The rubber is then vulcanized for 10 minutes at 325° F. The membrane material is semiconductive.

EXAMPLE VI

A shoe sole stock was prepared by blending together the following ingredients, in parts by weight:

| Copolymer | A | B | C | D |
|---|---|---|---|---|
| Percent block polystyrene | 10 | 17 | 34 | 0 |
| Polymer | 100 | 100 | 100 | 100 |
| Nonconductive carbon black | 40 | 40 | 40 | 40 |
| Zinc oxide | 5 | 5 | 5 | 5 |
| CaCO$_3$ | 15 | 15 | 15 | 15 |
| MgCO$_3$ | 5 | 5 | 5 | 5 |
| Stearic acid | 2 | 2 | 2 | 2 |
| Isopropyl diphenylamine | 1 | 1 | 1 | 1 |
| Coumarone idene resin | 10 | 10 | 10 | 10 |
| Naphthenic extender oil | 15 | 10 | 20 | 10 |
| Clay | 20 | 20 | 20 | 20 |
| Benzothiazyl disulfide | 1.5 | 1.5 | 1.5 | 1.5 |
| Diphenyl guanidine | 0.5 | 0.5 | 0.5 | 0.5 |
| Sulfur | 1.7 | 1.7 | 1.7 | 1.7 |

After blending, the sheet was calendered to a thickness of about 0.050 inch, then vulcanized for 15 minutes at 300° F. The resistivity of the vulcanized sheets was measured. The results of that testing are as follows:

TABLE V

| Copolymer Blend: | Resistivity, ohm-cm. |
|---|---|
| A | $4.7 \times 10^6$ |
| B | $7.4 \times 10^6$ |
| C | $2.4 \times 10^6$ |
| D | $9.7 \times 10^{13}$ |

The above data illustrate that a nonconductive carbon black incorporated into a shoe sole recipe based on a butadiene-styrene block copolymer containing polystyrene block segments renders the composition semiconductive. Shoe soles prepared from such compositions are less prone to static build-up than soles prepared from similar compositions but containing instead, butadiene-styrene random copolymers.

Reasonable variations and modifications of this invention are possible yet still within the scope of this disclosure without departing from the intended scope and spirit thereof.

I claim:

1. An antistatic shoe sole stock having a resistivity in the range of $10^3$ to $10^8$ ohm-cm. prepared from a vulcanizable composition consisting essentially of a block copolymer having the formula $$A-B$$

wherein A is an essentially homopolymer block formed from a monovinyl aromatic hydrocarbon having 8 to 15 carbon atoms and B is selected from the group consisting of an essentially homopolymer block formed from a conjugated diene having 4 to 8 carbon atoms and a copolymer block formed from a conjugated diene having 4 to 8 carbon atoms and a monovinyl aromatic hydrocarbon having 8 to 15 carbon atoms, the monovinyl aromatic hydrocarbon homopolymer content being from 10 to 40 percent by weight of the block copolymer and about 20 parts by weight of a normally nonconductive carbon black per 100 parts by weight of said block copolymer.

2. A shoe sole stock according to claim 1 wherein said block copolymer is formed from 1,3-butadiene and styrene and said normally nonconductive carbon black is an HAF carbon black.

3. A semiconductive membrane having a resistivity in the range of $10^3$ to $10^8$ ohm-cm. prepared from a vulcanizable composition consisting essentially of a block copolymer having the formula $$A-B$$

wherein A is an essentially homopolymer block formed from a monovinyl aromatic hydrocarbon having 8 to 15 carbon atoms and B is selected from the group consisting of an essentially homopolymer block formed from a conjugated diene having 4 to 8 carbon atoms and a copolymer block formed from a conjugated diene having 4 to 8 carbon atoms and a monovinyl aromatic hydrocarbon having 8 to 15 carbon atoms, the monovinyl aromatic hydrocarbon homopolymer content being from 10 to 40 percent by weight of the block copolymer and about 20 parts by weight of a normally nonconductive carbon black per 100 parts by weight of said block copolymer.

4. A membrane according to claim 3 wherein said block copolymer is formed from 1,3-butadiene and styrene and said normally conductive carbon black is an HAF carbon black.

References Cited
UNITED STATES PATENTS

| 3,030,346 | 4/1962 | Cooper | 260—41.5 R |
| 3,449,306 | 6/1969 | Zelinski | 260—41.5 R |

OTHER REFERENCES

Morton: Introduction to Rubber Technology (Reinhold) (N.Y.) (1959), pp. 205–207.

MORRIS LIEBMAN, Primary Examiner

H. H. FLETCHER, Assistant Examiner

U.S. Cl. X.R.

117—226; 260—42.32, 42.47, 85.1